July 15, 1941.  E. C. JOHNSTON ET AL  2,249,311
EXTRUSION DEVICE
Filed March 11, 1940  2 Sheets-Sheet 1
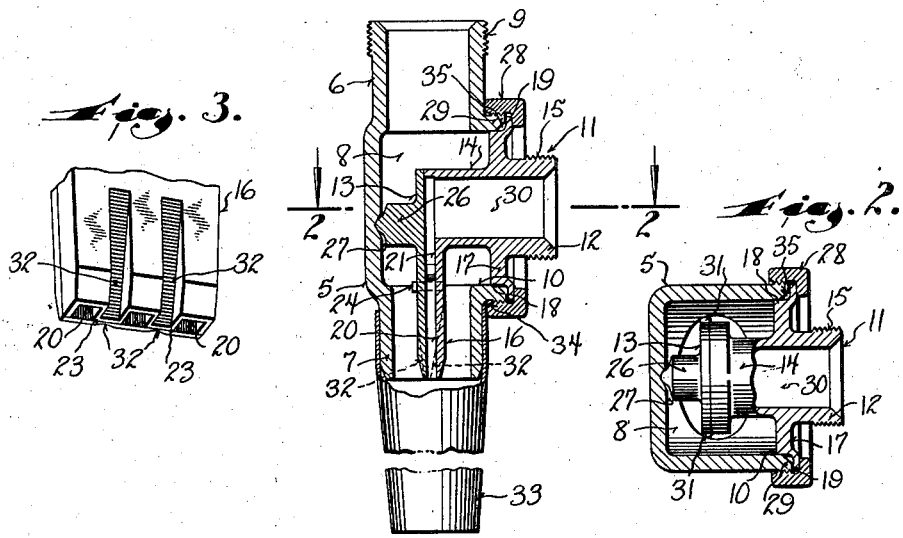
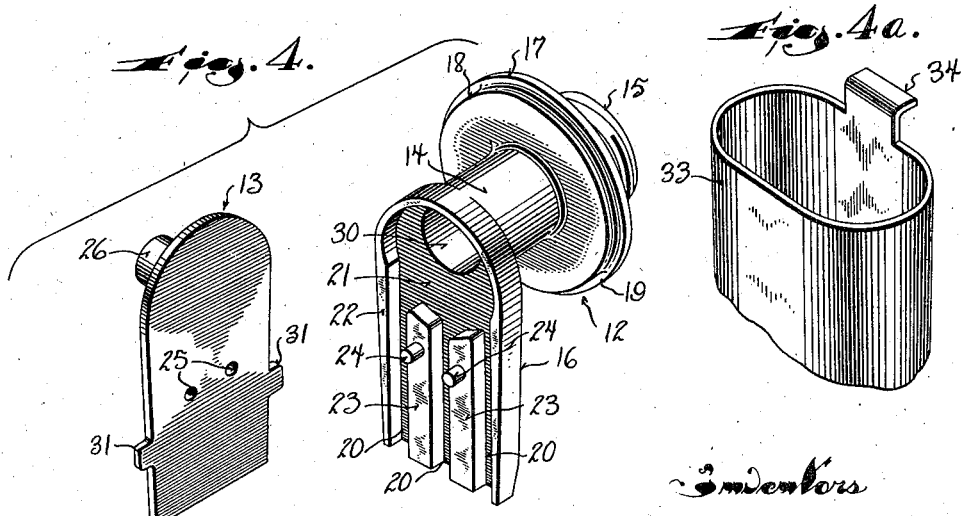
Inventors
Edward C. Johnston
Arthur B. Webb

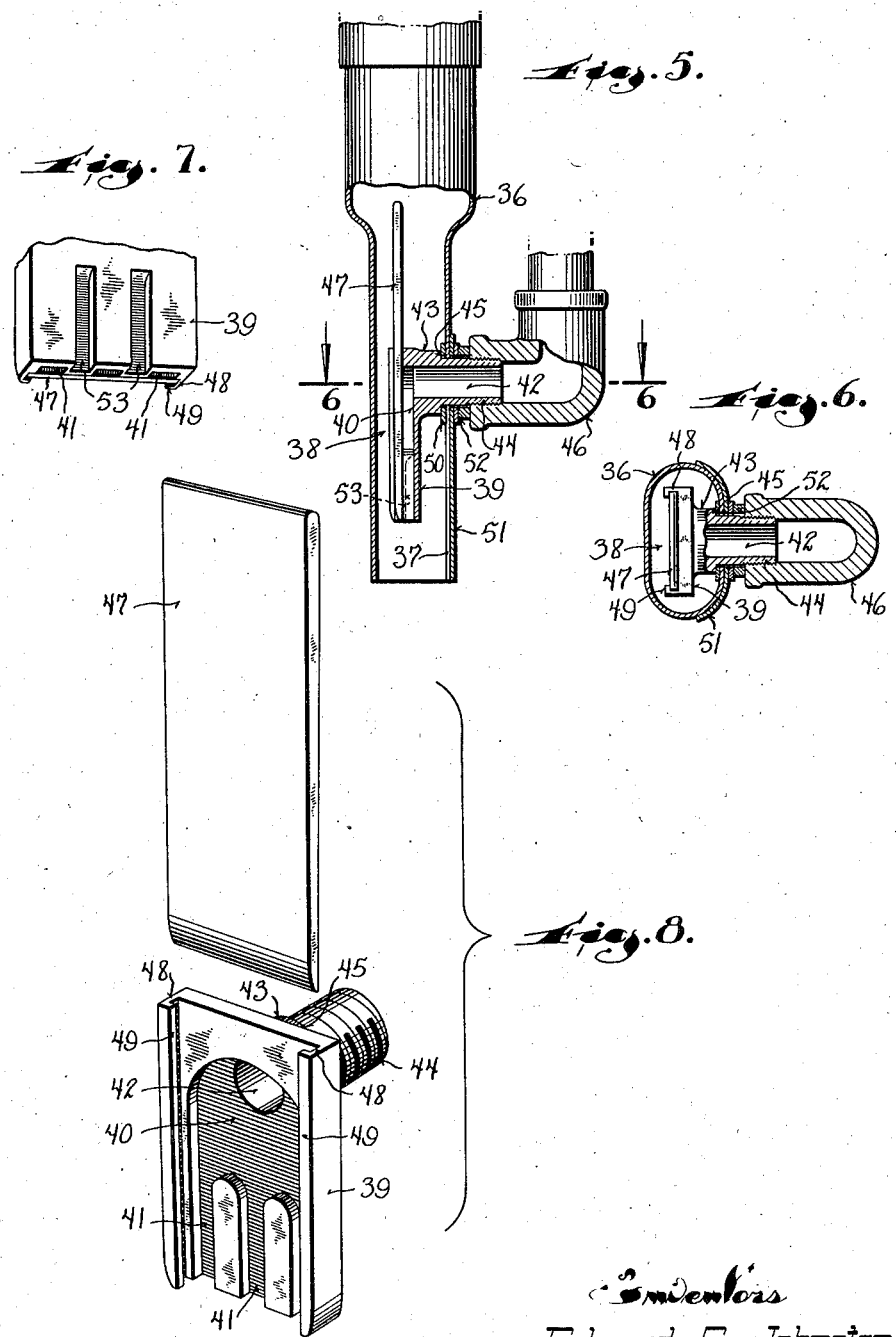

Patented July 15, 1941

2,249,311

UNITED STATES PATENT OFFICE 2,249,311

EXTRUSION DEVICE

Edward C. Johnston and Arthur B. Webb, Milwaukee, Wis., assignors to Robert A. Johnston Company, Milwaukee, Wis., a corporation of Wisconsin Application March 11, 1940, Serial No. 323,338

23 Claims. (Cl. 107—1)

This invention relates to extrusion devices or nozzles and has, as a general object, the provision of a simple, practical unit for embedding chocolate fudge or the like in ice cream to give the same a novel appearance.

Stringent laws govern the construction and design of equipment used in the dairy industry. One of the prerequisites laid down by these laws is that all parts of the equipment which come in contact with the milk or ice cream shall be so constructed that all portions thereof are readily accessible for cleaning and inspection.

It is, therefore, another object of this invention to provide an extrusion device suitable for injecting a core of fudge or similar material into ice cream which is so designed that unrestricted access may be quickly had to the inside of the small discharge passages through which the fudge is extruded.

In this connection, it is another object of the present invention to provide an extrusion device of the character described wherein the core forming nozzle is composed of readily disassembled complementary sections with the small passages formed at the juncture of the sections so that upon disassembly all of the passages through which the core forming material flows are exposed and unrestrictedly accessible.

In the interest of simplicity, the present invention has, as another of its objects, the provision of an extrusion device of the character described wherein the core forming nozzle is insertable through an opening in the side wall of the main nozzle to be held in place by a single clamping nut.

Another object of this invention is to provide a structure of the character described wherein the tightening of the nut which connects the two nozzles also clamps the complementary sections of the core forming nozzle together.

Still another object of this invention is to provide a simple manner of quickly removably securing an extension to the end of the main nozzle.

With the above and other objects in view, which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claims.

The accompanying drawings illustrate two complete examples of the physical embodiment of the invention, constructed in accordance with the best modes so far devised for the practical application of the principles thereof, and in which—

Figure 1 is a view partly in side elevation and partly in longitudinal section illustrating one embodiment of this invention;

Figure 2 is a cross sectional view taken through Figure 1 on the plane of the line 2—2;

Figure 3 is a perspective view showing the lower end of the core forming nozzle used in the embodiment of the invention shown in Figure 1;

Figure 4 is a perspective view of the two complementary parts of the core forming nozzle shown disassembled;

Figure 4a is a perspective view of the upper end of the removable extension;

Figure 5 is a view similar to Figure 1 illustrating another embodiment of the invention;

Figure 6 is a cross sectional view taken through Figure 5 on the plane of the line 6—6;

Figure 7 is a perspective view of the discharge end of the core forming nozzle of the unit shown in Figure 5; and Figure 8 is a perspective view of the complementary sections which comprise the core forming nozzle in this embodiment of the invention.

Referring now particularly to the accompanying drawings (and especially to Sheet 1) in which like numerals indicate like parts, the numeral 5 designates the main nozzle of the extrusion device. This nozzle consists essentially of a vertical tubular body having a round upper end 6, an oval discharge end 7, and a medial chamber 8 substantially rectangular on a transverse plane. The round upper end 6 is threaded, as at 9, to enable the attachment of the nozzle to any suitable supply pipe leading from a continuous freezer so that the ice cream in a semi-frozen state is extruded or caused to flow down through the main nozzle to issue from the lower oval discharge end 7.

One side wall of the medial chamber 8 has a relatively large round hole 10 therein through which a core forming nozzle, indicated generally by the numeral 11, is insertable. The core forming nozzle comprises a main section 12 and a cover section 13.

The main section 12 has a cylindrical tubular body 14, the outer end 15 of which is threaded, and the inner end of which has a downward extension 16 formed thereon. Medially of its ends, the tubular cylindrical body 14 has a flange 17 formed thereon. The edge of this flange is stepped to provide a plug portion 18 of a size to fit snugly in the hole 10 and a rim 19 to overlie the peripheral edge of the hole.

The downward extension 16 has its outer face cut away, as best shown in Figure 4, to provide a plurality of vertical restricted discharge passages 20 connected by a header chamber 21. These passages and the header are closed by the cover section 13 which lies flush against the marginal rim or flange 22 extending about the side and top edges of the extension and the partitions 23 which separate the restricted discharge passages.

The cover section is held against shifting laterally on the main section by dowel pins 24 projecting from the partitions 23 and entering holes 25 in the cover section.

The core forming nozzle, with its cover section properly in place, is readily insertable through the hole 10 to its operative position illustrated in Figure 1, at which a boss or lug 26 projecting from the cover section bears against the wall 27 of the main nozzle opposite the hole 10. In this position of the parts, the plug portion 18 of the flange fits in the hole 10 with a plug fit and the rim 19 is slightly spaced from the peripheral edge of the hole.

A clamping nut 28 threaded on an extension 29 surrounding the outer end of the hole 10 draws the core forming nozzle into the main nozzle and thereby clamps the cover section between the main section and the wall 27. The nut 28 thus not only serves to quickly detachably hold the nozzles assembled, but it also holds the sections of the core forming nozzle together.

This latter function is facilitated by the fact that the boss or lug 26 is spaced downwardly from the axis of the inlet passage 30 through the cylindrical body of the core forming nozzle to more equally distribute the force over the entire area of the cover section.

Assurance against displacement of the core forming nozzle from its proper position at which its extension 16 is equi-spaced from the walls of the oval-shaped discharge end of the main nozzle is afforded by lugs 31 which extend from the sides of the cover section to engage the adjacent walls of the main nozzle.

When in use, the upper inlet end of the main nozzle is connected with the discharge of a continuous ice cream freezer and the threaded inlet end 14 of the core forming nozzle is connected with a suitable source of plastic fudge under pressure. Consequently, the fudge is extruded in three small streams into the body or stream of ice cream being extruded through the main nozzle.

To insure against the formation of voids in the stream as it passes the core forming nozzle, the lower discharge end of the extension 16 and also the cover section 13 are cut away, as at 32, between the restricted discharge passages 20. This permits the ice cream to flow closely around the cores of fudge issuing from the restricted discharge passages.

The provision of the boss or lug 26 also aids in assuring a solid stream free from voids by more or less balancing the obstruction to the flow of ice cream formed by the cylindrical body of the core forming nozzle.

Uniform flow velocity is assured by the increase in cross sectional area of the main nozzle at its medial portion or chamber 8 to compensate for the obstructions formed by the entrance of the core forming nozzle; and uniform flow through the three restricted core forming discharge passages is assured by the expansion chamber effect afforded by the header 21.

As is customary in the manufacture of ice cream, the stream issuing from the oval discharge end of the main nozzle with the fudge core therein is discharged into the conventional pail-like containers and by moving the containers with relation to the nozzle as the ice cream fills the same, the incoming stream is folded back and forth to produce the desired marble-like effect.

If desired, an extension 33 may be attached to the discharge end of the main nozzle to facilitate reaching the bottom of the container without breaks in the ribbon or stream issuing from the nozzle. This tubular extension telescopes over the lower end of the main nozzle and is held in place by a lip 34 extended from one edge thereof and engaging under the rim of the clamping nut 28, as clearly shown in Figure 1.

With the construction just described, it will be readily apparent that assembly and disassembly of the parts can be quickly effected and that when disassembled, all portions of the entire structure are unrestrictedly accessible for cleaning and inspection.

Lifting the cover section 13 from the extension of the main section of the core forming nozzle completely exposes the restricted discharge passages 20, as clearly shown in Figure 4. It also affords unrestricted access to the inlet passage 30 which is then open at both ends to facilitate inspection and cleaning.

Attention is also directed to the fact that the inner peripheral edge of the hole 10 is bevelled, as at 35. This enables the hole to be closed by a conventional sealing cap whenever it is desirable to use the nozzle in the ordinary way without the core forming feature.

The modified embodiment of the invention illustrated on Sheet 2 of the drawings consists of a main nozzle 36 having its upper end provided with any suitable means for coupling the same to the discharge of a continuous freezer and having its lower end portion substantially oval-shaped in cross section.

One side wall of the lower oval-shaped portion of the main nozzle has a longitudinal slot 37 extending up from its bottom edge. This slot enables assembly of a core forming nozzle, indicated generally by the numeral 38, with the main nozzle in a manner to be described.

As best shown in Figure 8, the core forming nozzle has a main section consisting of a substantially flat portion 39, the outer face of which is cut out to define a header 40 and restricted discharge passages 41 leading downwardly therefrom. The header connects with an inlet passage 42 which extends through a cylindrical extension 43, the outer end 44 of which is reduced in diameter to provide a shoulder 45.

The reduced outer end portion 44 is externally threaded for the reception of a coupling elbow 46, or its equivalent, by which the core forming nozzle is connectible with a source of fudge under pressure.

The header 40 and the restricted discharge passages 41 formed in the flat portion 39 of the core forming nozzle are closed by a cover plate 47 which is slightly wedge-shaped, as shown in Figure 8, and which is slidable between flanges 48 on the edges of the portion 39 and under ledges 49 formed thereon.

The taper of the plate and the undersurface of the ledges 49 corresponds and is such that when the plate is driven "home," the lower end thereof is flush with the bottom of the portion 39.

The slot 37 permits endwise application of the assembled core forming nozzle to the main nozzle, it being preferable to provide a washer 50 between the shoulder 45 and the inner slotted wall of the main nozzle.

Overlying the outer slotted wall of the main nozzle is a plate 51 curved to fit the outer slotted wall and apertured to receive the reduced outer end portion 44. Washers 52 applied to the end portion 44 and confined between the plate 51 and the adjacent end of the elbow 46 enable the parts to be clamped together as the elbow is tightened.

As in the embodiment of the invention previously described, it is also preferable in this case to cut away the back of the portion 39 between the discharge passages 41 at least at the lower discharge end thereof, as shown at 53 in Figure 7.

From the foregoing description taken in connection with the accompanying drawings, it will be readily apparent that this invention provides an extrusion device especially adaptable for use in the manufacture of marble-like ice cream or in connection with any food product where it is desirable to embed a core of one substance in a body of different substance, for the reason that all parts of the device are readily accessible for cleaning and sterilizing, particular attention being directed to the fact that there are no food passages which cannot be fully exposed for inspection and cleaning.

What we claim as our invention is:

1. An extrusion device comprising: a main nozzle; a core forming nozzle extending into the main nozzle through a side wall thereof and having a discharge passage, the mouth of which is spaced from the walls of the main nozzle; and said core forming nozzle being composed of readily separable sections joined on a line of parting extending longitudinally along the length of the discharge passage so that upon separation of its sections unrestricted access may be had to its discharge passage for cleaning.

2. In a device of the character described: a main nozzle having an opening in its side wall; a core forming nozzle having a part passing through said opening; and means for readily separably holding said nozzles assembled; the discharge end portion of said core forming nozzle comprising complementary readily separable sections joined on a line of parting extending lengthwise of its discharge passage so that ready access may be had to all internal parts of the nozzles upon disassembly to facilitate cleaning thereof.

3. In an extrusion nozzle for use with food products which necessitates unrestricted access to all portions thereof to insure cleanliness; complementary readily separable sections, one of which has a large unrestricted inlet passage formed therein leading to a restricted discharge passage defined jointly by said sections, the line of parting between said separable sections extending longitudinally along the length of the discharge passage so that said discharge passage is completely open upon disassembly of said sections; and means for readily separably holding said sections assembled.

4. In an extrusion device for use with food products wherein the necessity for cleanliness requires unrestricted access to all parts; complementary readily separable sections coacting to define a plurality of restricted discharge passages from which food is to be extruded in small streams, one of said sections having a large unrestricted inlet passage formed therein leading to said restricted discharge passages and the other section having a wall portion disposed transversely to the axis of the inlet passage and so located as to form an end wall for the passage, the removal of which upon disassembly of said sections leaves the inlet passage unrestrictedly open at both ends; and means for readily separably holding said complementary sections assembled.

5. In a food extruding nozzle of the character described: complementary readily separable sections having their meeting portions formed to define a plurality of restricted discharge passages which are entirely exposed throughout their length upon disassembly of said sections; means for holding the sections assembled under pressure; and one of said sections having an unrestricted inlet passage leading to the restricted discharge passages and so located that the other section forms an end wall therefor when the sections are assembled and the inlet passage is unrestrictedly open at both ends upon disassembly of the sections.

6. An extrusion device comprising: a main nozzle having an opening in its side wall; a duct passing through said opening; means for removably securing said duct to the main nozzle; and means connected with the inner end of the duct defining a header directly connected with the duct interior and a plurality of restricted discharge passages leading from the header, said means having a section removable to expose the header, the duct interior and the restricted discharge passages for inspection and cleaning.

7. An extrusion device of the character described comprising: a main nozzle having a large hole in its side wall; a core forming nozzle passing through said hole and composed of readily separable complementary sections, said core forming nozzle having a restricted discharge passage formed at the juncture between sections so as to be open for unrestricted access thereto upon disassembly of said sections and having a large inlet passage in its portion which passes through the large hole, said inlet passage leading to the restricted discharge passage and being open at both ends upon disassembly of said sections; a part carried by the core forming nozzle closing the hole around the portion of the core forming nozzle which passes through said hole; and means for clamping said last named part to the main nozzle.

8. An extrusion device of the character described comprising: a main nozzle having a hole in its side wall; a core forming nozzle having its discharge end inside the main nozzle and its inlet end outside the main nozzle, said core forming nozzle being of a size permitting its assembly with the main nozzle through the hole in its side wall; a flange on the core forming nozzle between its discharge and inlet ends of a size to close said hole; and means for readily separably holding said nozzles assembled.

9. An extrusion device of the character described comprising: a main nozzle having a hole in its side wall; a core forming nozzle comprising a main section having a large inlet passage therethrough and a cover section, said sections being formed at their juncture to define a restricted discharge passage connected with the inlet passage and adapted to be wholly exposed upon disassembly of said sections; the core forming nozzle being insertable through the hole in the side wall of the main nozzle and its main section having a portion closing said large hole when the nozzles are assembled; means on the cover section bearing against the adjacent wall of the main nozzle to hold the cover section to the main section; and means connected with the main nozzle and said portion of the main section for sealing the juncture therebetween and for forcing the main section towards the cover section.

10. An extrusion device of the character described comprising: a tubular body having a hole through a side wall thereof; a core forming nozzle composed of complementary sections positioned within said tubular body with one section thereof passing through said hole and the other section supported by the wall of the tubular body opposite the hole; and means for securing the core forming nozzle to the tubular body, said means acting to draw the core forming nozzle into the tubular body in a direction axial to said hole to thereby clamp the second named section of the core forming nozzle between the first named section thereof and said opposite wall of the tubular body.

11. In an extrusion device of the character described: a tubular body having a hole in one side thereof; a core forming nozzle having a main section passing through said hole, said main section having an inlet passage therethrough; a cover section for the core forming nozzle cooperating with the inner portion of the main section to define a header connected with said inlet passage and restricted discharge passages leading from the header, said cover section being confined between the main section and the wall of the tubular body which lies opposite said hole; and means for holding said core forming nozzle assembled with the tubular body, said means forcing the main section of the core forming nozzle toward its cover section.

12. In an extrusion device of the character described: a main nozzle having a hole through one side wall thereof; a core forming nozzle comprising a main section having a tubular part passing through said hole; a flange in said tubular part engaging the wall of the hole to close the same; a cover section for the core forming nozzle cooperating with the inner end portion of the main section to define a restricted discharge passage connected with the passage formed by the tubular part of the main section; means for holding the cover section against shifting laterally on the main section; means for supporting the cover section from the adjacent wall of the main nozzle so that inward force applied to the main section of the core forming nozzle reacts against the cover section to insure a tight joint between said sections; and means connected with the main nozzle and the flange on the tubular part of the main section for drawing the main section of the core forming nozzle inwardly toward the cover section.

13. In an extrusion device of the character described: a main nozzle having an enlarged medial portion with a hole in its side wall; a core forming nozzle having an inlet passage defined by a tubular portion which passes through said hole and having a discharge passage pointed in the direction of the discharge end of the main nozzle; and means in the enlarged medial portion of the main nozzle between the inner end of the core forming nozzle and the adjacent wall of the main nozzle to obstruct the flow through the main nozzle and balance the obstruction to such flow caused by the tubular inlet portion of the core forming nozzle.

14. In an extrusion device of the character described: a main nozzle having a hole through a side wall thereof; an externally threaded flange on the main nozzle encircling said hole; a core forming nozzle of a size to be insertable through said hole and composed of complementary main and cover sections, the main section having an inlet passage therethrough and being positioned within said hole, the cover section cooperating with the main section to define a discharge passage pointed toward the discharge end of the main nozzle; means on the main section of the core forming nozzle seated in said hole to close the same; and a clamping nut threaded on the extension of the main nozzle and bearing against said last named means to hold the nozzles assembled with a leak-proof joint therebetween.

15. In an extrusion device of the character described: a main nozzle having a hole through a side wall thereof; an externally threaded flange on the main nozzle encircling said hole; a core forming nozzle of a size to be insertable through said hole and composed of complementary main and cover sections, the main section having an inlet passage therethrough and being positioned within said hole, the cover section cooperating with the main section to define a discharge passage pointed toward the discharge end of the main nozzle; means on the main section of the core forming nozzle seated in said hole to close the same; a clamping nut threaded on the extension of the main nozzle and bearing against said last named means to hold the nozzles assembled with a leak-proof joint therebetween; and a lug on the cover section bearing against the adjacent inner wall of the main nozzle to react against the force of the clamping nut and thereby clamp the cover and main sections of the core forming nozzle together.

16. In an extrusion device of the character described: a main nozzle having a hole through a side wall thereof; an externally threaded flange in the main nozzle encircling said hole; a core forming nozzle of a size to be insertable through said hole and composed of complementary main and cover sections, the main section having an inlet passage therethrough and being positioned within said hole, the cover section cooperating with the main section to define a discharge passage pointed toward the discharge end of the main nozzle; means on the main section of the core forming nozzle seated in said hole to close the same; a clamping nut threaded on the extension of the main nozzle and bearing against said last named means to hold the nozzles assembled with a leak-proof joint therebetween; an extension adapted to be telescoped over the discharge end of the main nozzle; and a lip on the extension engageable under the rim of the clamping nut.

17. In an extrusion device comprising: a main section having a tubular portion providing an inlet passage and a lateral extension connected with said tubular portion, the outer face of said lateral extension being grooved to provide a discharge passage connected with the inlet passage; and a cover plate readily removably secured to the outer face of said extension to close the groove and the adjacent end of the inlet passage.

18. In an extrusion device: a tubular member providing an inlet passage; a lateral extension on the tubular member having its outer face cut out to provide a header and a plurality of restricted discharge passages leading from the header; and a cover plate readily removably secured to the outer face of said extension to close the header and the restricted discharge passages.

19. In an extrusion device: a tubular member providing an inlet passage; a lateral extension on the tubular member having its outer face grooved to provide a restricted discharge passage connected with the inlet passage; a wedge-shaped cover plate removably fitted to the outer face of the lateral extension; and means on said lateral extension spaced from the outer face thereof between which and the outer face, said cover plate may be wedged.

20. An extrusion device of the character described comprising: a tubular body having an inlet end, an outlet end portion and a medial chamber; a branch duct entering said tubular body through the wall of its medial portion, said branch duct having an inlet end outside the medial chamber and a discharge end portion extending from the medial chamber a substantial distance into the outlet end portion and substantially equi-spaced from the walls of the outlet end portion so that material extruded from said discharge end portion forms a core in the material being extruded through the tubular body; and said tubular body having its cross sectional area increased at the medial portion and outlet end portion to compensate for the obstruction formed by the branch duct and thus assure uniform flow velocity through the entire tubular body.

21. In an extrusion device: a tubular body portion providing an inlet passage; a lateral extension on the body portion having a plurality of restricted discharge passages; and means defining a header connecting the inlet passage with the restricted discharge passages, said header being large in comparison with the cross sectional area of the discharge passages so as to form an expansion chamber to insure equal flow velocity through all discharge passages.

22. In a nozzle having a discharge end and a threaded boss on its side wall: a tubular extension telescoped onto the discharge end; and means for removably holding the extension in place comprising, an outward lateral projection on the extension positioned to lie adjacent to the threaded boss and a nut threaded onto the boss and having a rim engaging over said lateral extension.

23. In a nozzle having a discharge end and a hole through its side wall: a part inserted into the nozzle through said hole; a threaded flange encircling the hole; a nut threaded onto said flange for holding said part in place; an extension fitted to the discharge end; and means for readily removably holding the extension in place comprising, an outward lateral projection adjacent to the threaded flange and a rim on the nut engaging over said extension.

EDWARD C. JOHNSTON.
ARTHUR B. WEBB.

CERTIFICATE OF CORRECTION.

Patent No. 2,249,311. July 15, 1941.

EDWARD C. JOHNSTON, ET AL.

It is hereby certified that error appears in the printed specification of the above numbered patent requiring correction as follows: Page 4, first column, line 48, for the word "in" read --on--; and that the said Letters Patent should be read with this correction therein that the same may conform to the record of the case in the Patent Office.

Signed and sealed this 26th day of August, A. D. 1941.

(Seal)

Henry Van Arsdale,
Acting Commissioner of Patents.